United States Patent [19]

Howle

[11] Patent Number: 4,863,181

[45] Date of Patent: Sep. 5, 1989

[54] FOLDABLE WHEELCHAIR

[76] Inventor: Edward S. Howle, Rte. 7, Box 278 A, Durham, N.C. 27707

[21] Appl. No.: 200,564

[22] Filed: May 31, 1988

[51] Int. Cl.[4] .................. B62M 1/14

[52] U.S. Cl. .................. 280/250.1; 280/42; 280/650; 297/42; 403/349

[58] Field of Search .................. 280/242 WC, 42, 647, 280/650, 657; 297/DIG. 4, 16, 42, 44, 45; 403/349, 348

[56] References Cited

U.S. PATENT DOCUMENTS

| | | | |
|---|---|---|---|
| 330,231 | 11/1885 | Hall et al. | 297/44 |
| 2,632,654 | 3/1953 | Cornish | 297/44 |
| 3,142,351 | 7/1964 | Green | 297/44 |
| 4,343,482 | 8/1982 | Wegner | 280/650 |
| 4,493,488 | 1/1985 | Panaia et al. | 280/650 |
| 4,679,816 | 7/1987 | Riikonen | 280/650 |
| 4,679,849 | 7/1987 | Torgny | 297/330 |
| 4,682,783 | 7/1987 | Kuschall | 280/242 |
| 4,682,784 | 7/1987 | Anderson | 280/242 |
| 4,712,830 | 12/1987 | Charbrol et al. | 297/42 |

FOREIGN PATENT DOCUMENTS

| | | | |
|---|---|---|---|
| 2252838 | 6/1975 | France | 297/DIG. 4 |
| 711448 | 6/1954 | United Kingdom | 280/42 |

OTHER PUBLICATIONS

Publication by *Homecare,* Jul. 1986, pp. 38, 55–56, 59 and 82.
Publication by *Canyon Products,* Sep. 1986, p. 7.
Publication by *Home Health Care Products,* Mar. 31, 1988, p. 20.
Publication by *Homecare,* Apr. 1988, pp. 111–112, and 128.

*Primary Examiner*—David M. Mitchell
*Assistant Examiner*—Eric Culbreth
*Attorney, Agent, or Firm*—Richard E. Jenkins

[57] ABSTRACT

A foldable wheelchair is provided which includes first and second side frames which each rotatably carry a drive wheel and traveling wheel. A foldable seat extends between the side frames to form a flat, rigid surface when the wheelchair is open and to collapsably pivot upwardly when the wheelchair is folded. First and second hinges are positioned beneath and behind the foldable seat, respectively, and each extends between the side frames so as to pivot about an upwardly extending axis and to move rearwardly as the wheelchair is folded. Both hinges comprise a first arm pivotably secured at one end to a respective one of the side frames and extending generally inwardly and rearwardly of the foldable seat and a second arm pivotably secured at one end to the other of the side frames and at the second end pivotably connected to the other end of the first arm so as to form a hinge therewith.

12 Claims, 6 Drawing Sheets

FOLDABLE WHEELCHAIR

TECHNICAL FIELD

The invention relates generally to wheelchairs, and more particularly to side-to-side foldable wheelchairs adapted for transportation from one location to another for use.

BACKGROUND ART

As is known to those familiar with collapsable wheelchair construction, the traditional collapsable wheelchair comprises a sling-like seat and back extending between the two sides of the wheelchair. The two sides of the wheelchair are part of an X frame assembly which performs a scissor-like folding movement when the sling seat is pulled upwardly. This type of wheelchair possesses positive attributes including the fact that it is necessary to raise the seat in order to fold the chair so as to prevent accidental folding thereof with the wheelchair occupied. Also, the traditional X frame obviates the need for a latching mechanism for the frame that would be difficult for a handicapped user of the wheelchair to operate.

Unfortunately, the traditional X frame wheelchair possesses the inherent shortcomings of user discomfort and incorrect posture due to lack of support by the sling seat and sling back. Therefore, it is generally agreed that a rigid-back resilient cushion for both the seat and back are to be preferred to the sling seat and sling back configuration for comfort and health reasons. Thus, collapsable wheelchairs utilizing X frames have been modified in the past by placing a removable rigid-back cushion assembly on the seat and/or the back of the wheelchair. This modification results in the necessity to remove the rigid-back cusions prior to folding the wheelchair. In some circumstances, latches have also been provided to secure the rigid-back cushions to the seat and/or back of the wheelchair, and these latches have been found difficult to operate by occupants of the wheelchair.

The manner in which the present invention eliminates the disadvantages of previously known foldable wheelchairs and advances the state of the art will be understood as this specification proceeds.

DISCLOSURE OF THE INVENTION

In accordance with the present invention, there is provided a wheelchair having a resilient seat cushion supported by a collapsable rigid seat as well as a resilient back cushion and back panel which are adapted so that the wheelchair can be folded without removing either the seat cushion or the back cushion and panel assembly. The wheelchair is further adapted so that the seat cushion and the back cushion and panel assembly may both be removed, if desired, so that the wheelchair can more easily be placed into a car trunk or the like for transportation. Furthermore, the foldable wheelchair of the invention obviates the need for a manual latch assembly to secure the back cushion and panel thereto since the wheelchair provides an automatic latch mechanism which locks the back cushion and panel assembly when the wheelchair is opened and unlocks the aforementioned assembly when the wheelchair is folded so that it may be easily removed therefrom if desired.

The side-to-side foldable wheelchair of the invention comprises first and second side frames each carrying a drive wheel and a traveling wheel. A foldable seat extends between the side frames which is adapted to form a substantially flat, rigid surface when the wheelchair is open and to collapsably pivot upwardly when the wheelchair is folded. A hinge located behind the foldable seat extends between the side frames and is adapted to pivot about an upwardly extending axis and more rearwardly as the hinge moves from a substantially open position when the wheelchair is open to a substantially closed position when the wheelchair is folded.

It is therefore an object of the present invention to provide an improved foldable wheelchair.

It is another object of the present invention to provide an improved side-to-side foldable wheelchair which includes a rigid seat and back with resilient cushions thereon that may be folded without necessitating the removal of the seat or back cushions.

Still another object of the present invention is to provide an improved side-to-side foldable wheelchair which is small and light and easily storable in a small car trunk.

Some of the objects of the invention having been stated, other objects will become evident as the description proceeds, when taken in connection with the accompanying drawings.

BEST MODE FOR CARRYING OUT THE INVENTION

Figure 1:
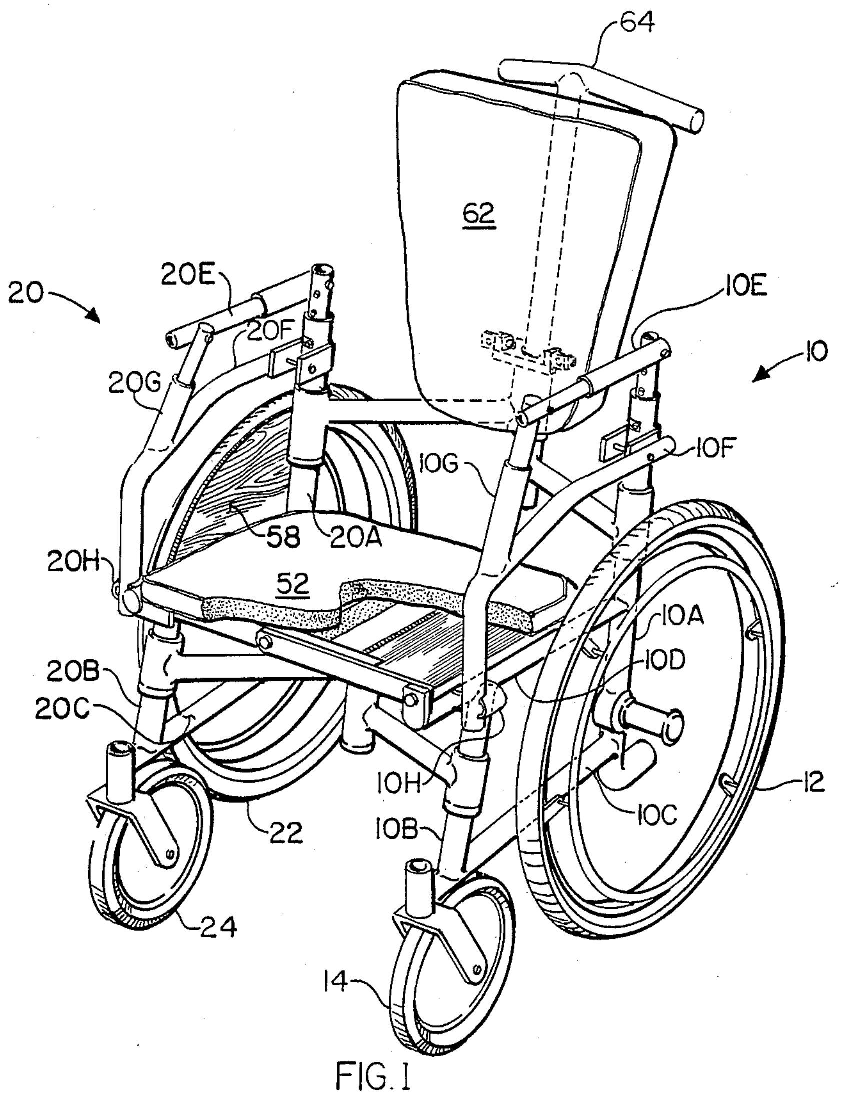
FIG. 1 is a perspective view of the more essential components of a wheelchair according to the present invention.
Figure 2:
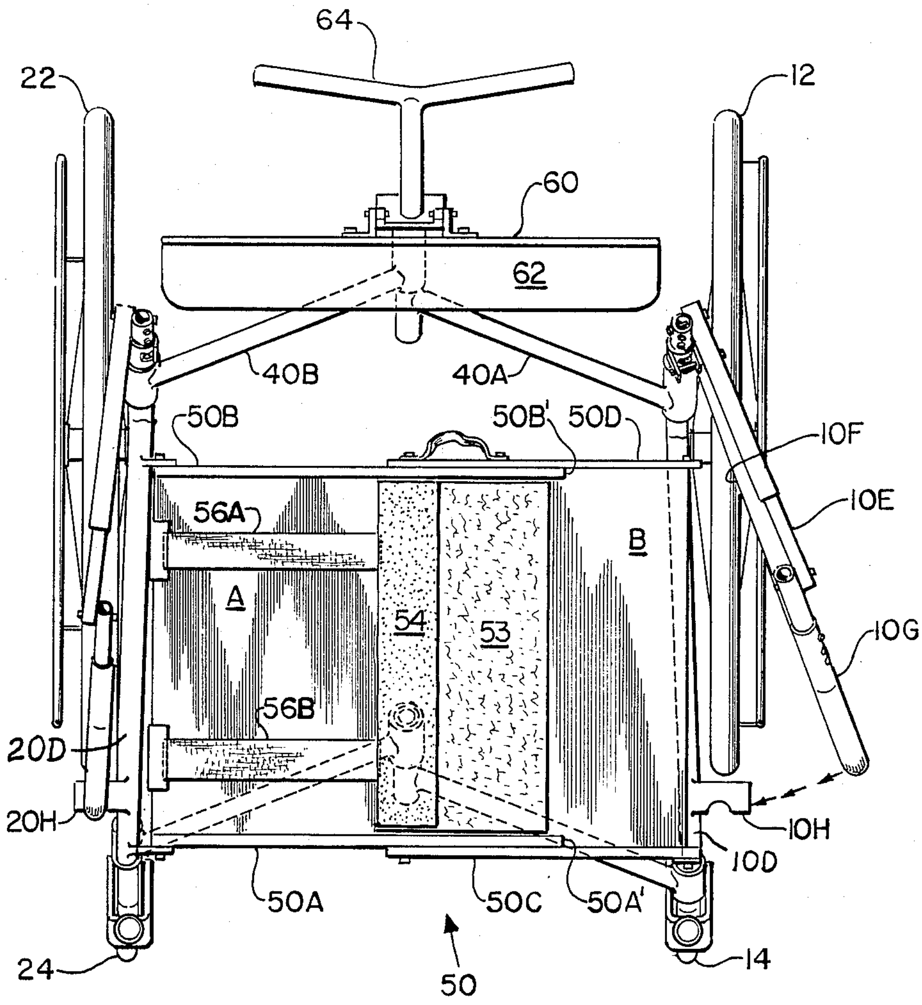
FIG. 2 is a top plan view of the wheelchair shown in FIG. 1 in a fully open position and with the seat cushion removed.
Figure 3:
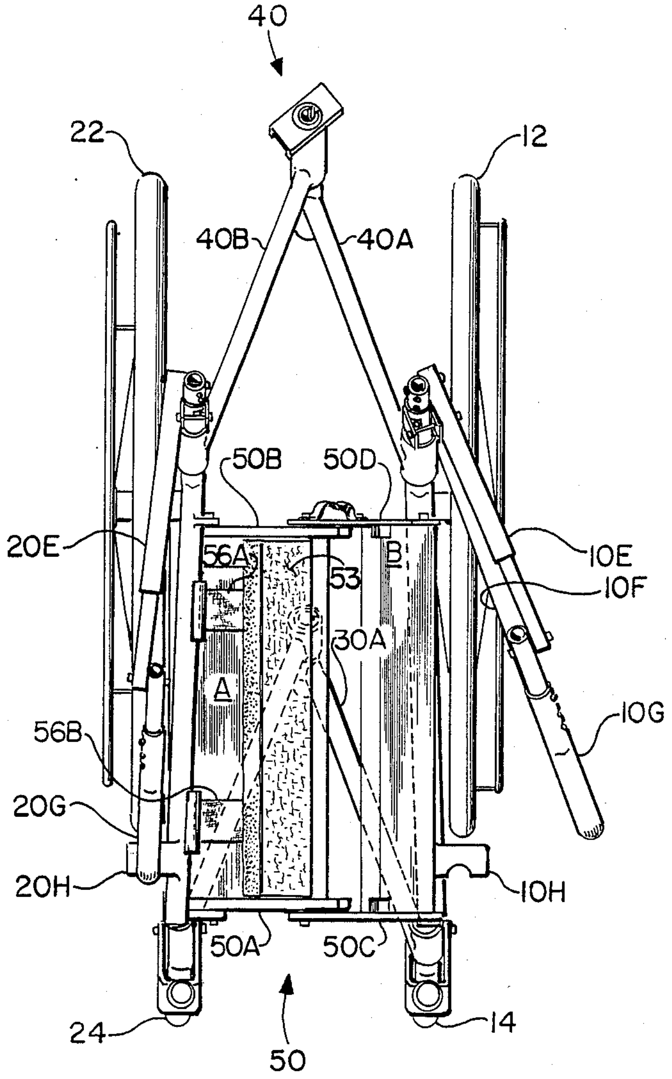
FIG. 3 is a top plan view of the wheelchair shown in FIG. 1 in a collapsed or folded position and with the seat cushion and back cushion and panel assembly removed.

With reference to FIGS. 1–6 of the drawings, the foldable wheelchair of the invention comprises two side frames which are generally designated 10 and 20. Side frame 10 comprises a vertical tubular members 10A and 10B which are connected by horizontal tubular members 10C and 10D to form a rigid side frame structure. A swing-away arm is a part of side frame 10 and comprises telescopic arm support 10E and arm support 10F which are pivotably mounted by suitable conventional means to vertical tubular member 10A at one end thereof and secured at the other end thereof to vertical arm support 1G. The vertical distance between horizontal arm supports 10E and 10F is adjustable to accommodate different size occupants of the wheelchair since both vertical arm support 10G and the upper end of vertical tubular member 10A to which arm support 10E is attached are telescopically adjustable in height within suitable limits of movement. The pivotal arm assembly comprising horizontal arm supports 10E, 10F and vertical arm support 10G is constructed so as to be upwardly pivotable in order to be removed from U-shaped retained 10H and then pivoted laterally outwardly in order to facilitate exit from the wheelchair by an occupant thereof. It should be appreciated that the actual construction of side frame 10 and the swing-away arm assembly thereof is a matter of design choice and that, although not shown, an arm support cushion would normally be provided on horizontal arm support 10E for the comfort of the user.

Side frame 20 is constructed similar to side frame 10 and includes vertical tubular members 20A and 20B, horizontal tubular members 20C and 20D, horizontal arm supports 20E and 20F, vertical arm support 20G and U-shaped retainer 20H for the pivotal arm assembly thereof.

Also, side frame 10 is provided with drive wheel 12 and traveling wheel 14 rotatably mounted thereto in a conventional manner known to those skilled in the wheelchair art, and side frame 20 has corresponding drive wheel 22 and traveling wheel 24 rotatably mounted thereto. Although not shown in the drawings in order to more clearly depict applicant's novel wheelchair structure, the wheelchair would most suitably include a foot support or rest pivotably mounted to each of traveling wheels 14 and 24 and a manual braking mechanism most suitably adapted to be actuated by the user to engage drive wheel 12 and drive wheel 22 as necessary to slow the wheelchair or to hold it in a stationary position.

Figure 4:
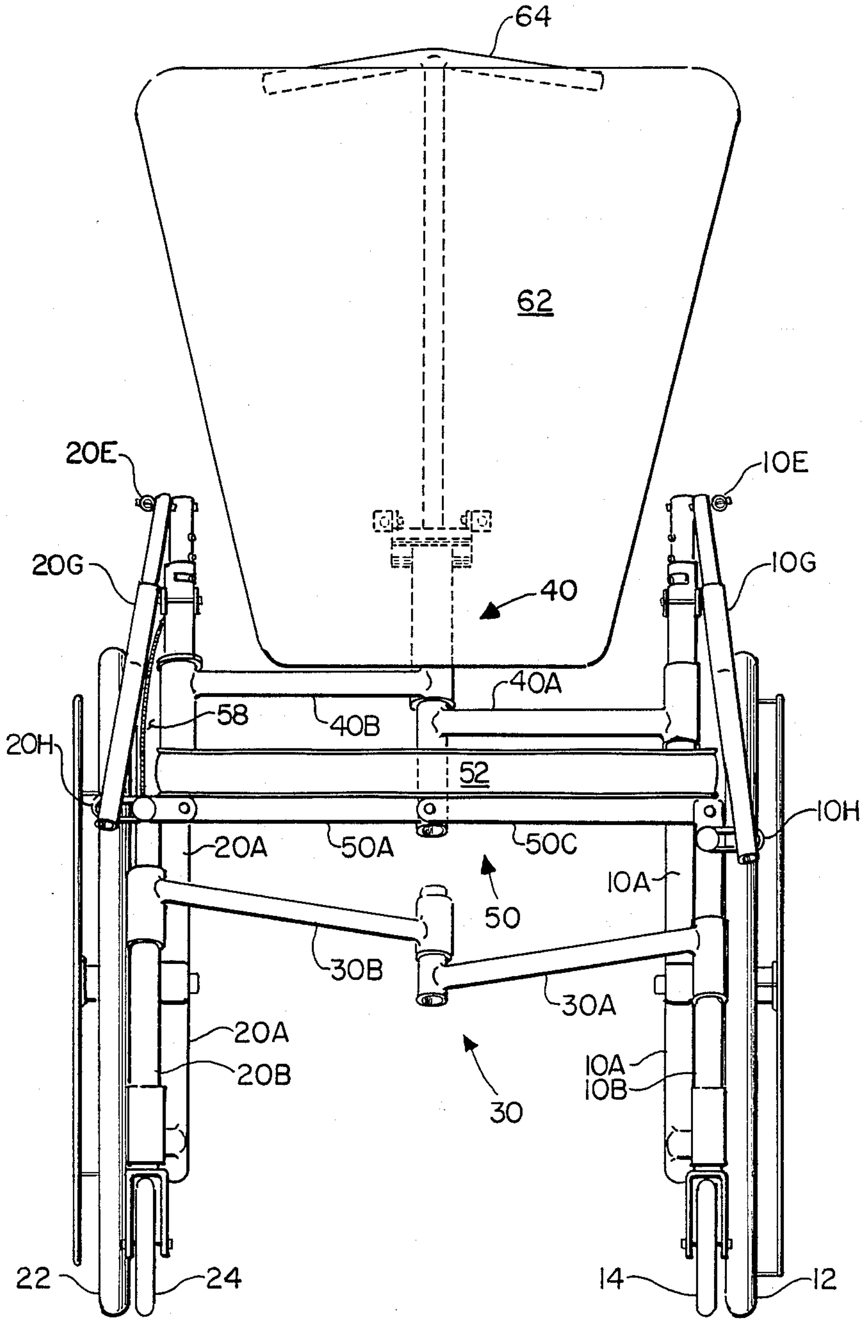
FIG. 4 is a front elevation view of the wheelchair shown in FIG. 1.
Figure 5:
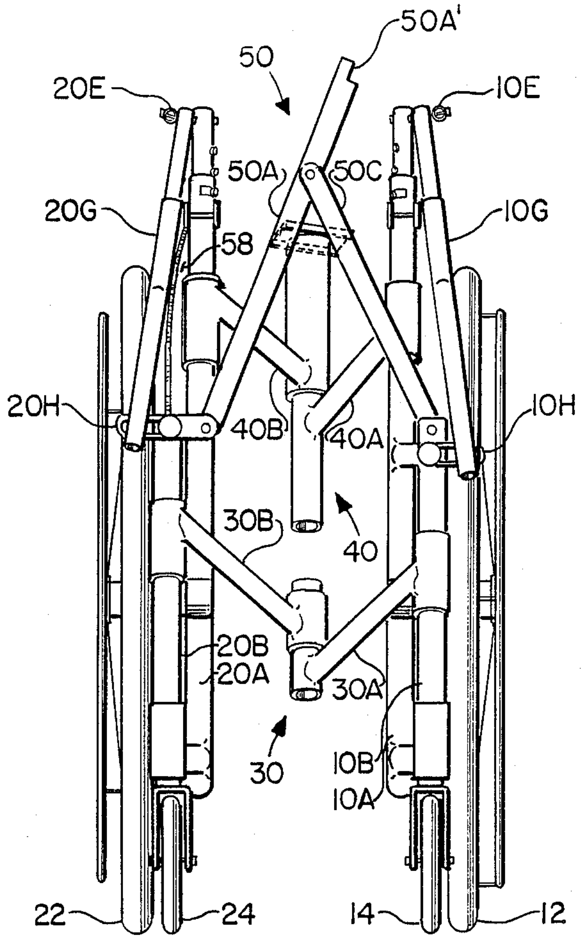
FIG. 5 is a front elevation view of the wheelchair shown in FIG. 1 in a collapsed or folded position with the seat cushion and back cushion and panel assembly removed.

With particular reference now to FIGS. 4 and 5, it can be seen that side frames 10 and 20 are connected by a first hinge, generally designated 30, a second hinge generally designated 40, and a collapsable seat generally designated 50. First hinge 30 is positioned beneath collapsable seat 50 and comprises two relatively pivotably movable hinge arms 30A and 30B. Hinge arm 30A is pivotably mounted to vertical tubular member 10B of side frame 10 at one end and to hinge arm 30B at the other end. Hinge arm 30B forms a pivotable hinge at one end with hinge arm 30A and is pivotably mounted to vertical tubular member 20B of side frame 20 at the other end. Second, hinge 40 is constructed of two pivotably movable arms 40A and 40B. Hinge 40A is pivotably mounted to vertical tubular member 10A of side frame 10 at one end and forms a pivotably movable hinge at the other end with hinge arm 40B. Hinge arm 40B is pivotably mounted at one end to hinge arm 40A and at the other end to vertical tubular member 20A of side frame 20. Thus, first hinge 30 and second hinge 40 are each positioned with a generally upwardly extending hinge pivoting axis and each hinge travels from a forward position when the wheelchair is open to a rearward position when the wheelchair is folded. First and second hinges 30 and 40, respectively, are each designed so that when the wheelchair is unfolded the hinge pivot axis lies in a plane behind the plane defined by the two pivot points of the hinge arms with the frame so that the hinge is never in a dead center position and thus will readily begin closing and moving rearwardly when side frames 10 and 20 of the wheelchair are urged inwardly. Most suitably, nylon bushings are provided at each of the three pivot points of first hinge 30 and second hinge 40.

Collapsable seat 50, as best seen in FIGS. 2–5, comprises two levers 50A and 50B which are each pivotably mounted to horizontal tubular member 20D of side frame 20 at one end and at the other end are pivotably joined with a second pair of pivotable levers 50C and 50D which are each mounted at their other end to horizontal tubular member 10D of side frame 10. Thus, pivotable levers 50A–50D form the frame of a rigid, flat seat when the wheelchair is open and will pivotably move upwardly when the wheelchair is folded (see FIGS. 2 and 5). Pivotable levers 50A, 50B have a first rigid seat portion A therebetween and pivotable levers 50C, 50D have a second rigid seat portion B therebetween, and pivotable levers 50A, 50B are each provided with an overlapping tab 50A', 50B' (see FIGS. 2 and 5) which serve as stops against the top of second seat portion B so as to render collapsable seat 50 flat and rigid when the wheelchair is open. As seen in FIGS. 1 and 4, a cushion 52 is placed on collapsable seat 50 for the comfort of the user.

Seat cushion 52 is removably secured to first rigid seat portion A by an elastic harness (see FIG. 2) comprising a flexible sheet material 53 and VELCRO strip 54 secured at one side of seat portion A with elastic strips 56A and 56B extending therefrom to the other side of seat portion A. The underside of cushion 52 is provided with a mating VELCRO strip (not shown) to removably engage VELCRO strip 54 of the harness assembly and thus be secured to collapsable seat 50 for the comfort of the user of the wheelchair. When the wheelchair is folded, cushion 52 will remain secured to the harness assembly of seat portion A and thus pivot upwardly therewith. A cushion shield 58 (see FIG. 1) is provided on side frame 20 to maintain cushion 52 in place as the wheelchair is folded and seat portion A of collapsable seat 50 pivots upwardly. The elastic harness assembly mentioned heretofore provides for a slight amount of vertical movement of cushion 52 as it is snubbingly engaged between shield 58 and upwardly pivoted seat portion A of collapsable seat 50. Also, the pivotable mounting locations of levers 50A and 50B to tubular member 20D of side frame 20 are spaced inwardly (see FIGS. 2 and 5) to allow room between seat portion A and cushion shield 58 for cushion 52 when the wheelchair is folded.

Finally, the wheelchair of the present invention includes a removable back assembly comprising a rigid back panel 60 (see FIG. 2) and a resilient back cushion 62 which are pivotably mounted to upright handle 64 which is removably received by second hinge 40. Thus, a removable back assembly with a cushion thereon is provided which is adapted to pivot when in use about a horizontal axis where back panel 60 is pivotably mounted to upright handle 64, and the entire back assembly is adapted to pivot towards the longitudinal direction of the wheelchair and to be removable for easy storing when the wheelchair is folded, as will be explained in detail below.

Figure 6:
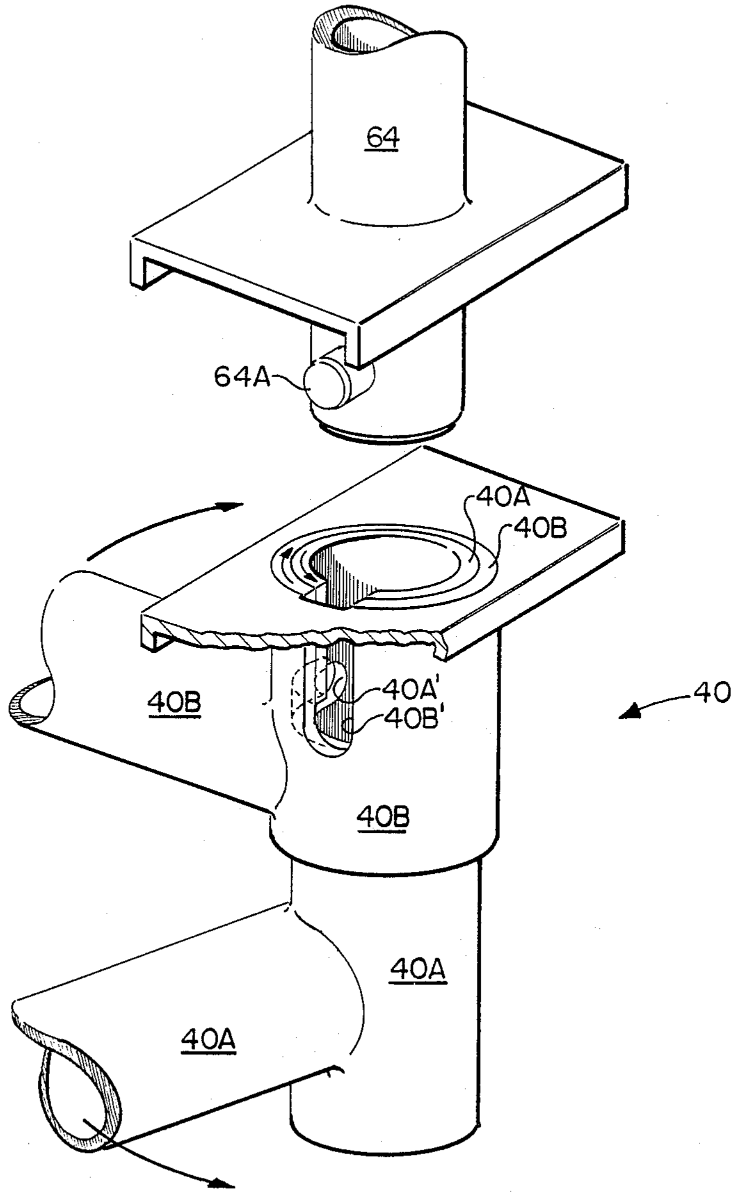
FIG. 6 is a fragmentary perspective view, with parts broken away for clarity, of the locking assembly of the wheelchair of the present invention for removably securing the back cushion and panel assembly to the frame.

Back panel 60, back cushion 62 and handle 64 of the removable back assembly of the wheelchair can best be seen now with reference to FIGS. 1–2, 4 and 6. With particular reference to FIG. 6, the locking feature of the wheelchair can be fully appreciated. As described heretofore, the removable back assembly of the wheelchair of the present invention does not require manual latching as do many rigid-back supports previously provided as add-on or removable back supports for conventional wheelchairs. The wheelchair of the present invention includes an automatic locking mechanism which serves to lock the removable back assembly to the wheelchair when the wheelchair is open and to unlock as well as pivot the back assembly towards the longitudinal direction of the wheelchair when the wheelchair is folded. This assures that the back assembly, including the wheelchair handle, cannot be accidentally removed while the wheelchair is open and occupied. The removable back assembly is adapted to pivot when the wheelchair is folded in order to facilitate folding the wheelchair into a relatively narrow width.

Both the locking and pivoting of the removable back assembly can be better explained with specific reference to FIG. 6 of the drawings illustrating hinge 40 when the wheelchair is folded. As seen therein, upright handle 64 is provided with a projection or lock pin 64A extending outwardly from the base thereof. Hinge 40, which is constructed so as to removably receive upright handle 64, comprises hinge arm 40A which terminates in a vertical tube which serves as the inside tube of second hinge 40 and hinge arm 40B which also terminates in a vertical tube which is pivotably mounted over the vertical tube of hinge arm 40A in order to form second hinge 40. The vertical tube of hinge arm 40B defines a vertical open-ended slot 40B' at the top thereof which is located so as to register with the upwardly extending portion of an open-ended and reverse L-shaped slot 40A' in the vertical tube of hinge arm 40A. When the two slots are superimposed as shown in FIG. 6, upright handle 64 may be slidably inserted into hinge 40 with lock pin 64A being received and traveling down the length of the two superimposed slots. In this position of hinge 40 corresponding to the wheelchair being folded, upright handle 64 of the back assembly may be either slidably inserted or slidably removed from second hinge 40 of the folded wheelchair. When upright handle 64 is initially inserted into second hinge 40, the back panel 60 and cushion 62 will be pivoted generally toward the lengthwise direction of the wheelchair. The wheelchair may then be opened which will force hinge arms 40A and 40B outwardly in the direction of the arrows of FIG. 6 which serves to rotate inner tube 40A and slot 40A' counterclockwise and outer tube 40B and slot 40B' clockwise and thus to (1) capture lock pin 64A in the laterally extending or leg portion of the reverse L-shaped slot of tube 40A and (2) to pivot handle 64 clockwise so that the back assembly extends transversely to the open wheelchair. Thus, the entire back assembly is locked into place extending transversely to the lengthwise direction of the wheelchair when the wheelchair is open and cannot be accidentally removed. Also, and very advantageously, the locking mechanism provided by second hinge 40 functions automatically and does not require any manual locking and unlocking of the back assembly which would present some inconvenience as well as risk of injury to the user of the wheelchair.

In operation, the wheelchair after use may be folded by merely pulling upwardly on a handle secured to collapsable seat 50. Collapsable seat 50 will pivot upwardly and first and second hinges 30 and 40, respectively, will travel rearwardly and close so as to accommodate the lateral collapsing of the wheelchair into a narrow configuration. Hinge 40 will also serve to unlock and pivot the back assembly generally towards the lengthwise direction of the wheelchair. As a matter of choice, seat cushion 52 and the removable back assembly may be left in place and the wheelchair stored and transported to a new location. If it is desired to place the folded wheelchair into a small compartment such as the trunk of a small car, seat cushion 52 and the back assembly may be removed in order that the height and width of the wheelchair as well as the weight thereof will be even further reduced.

It is contemplated that the preferred embodiment of the wheelchair will be constructed of 1 ⅛ inch aluminum tubing with selected wall thicknesses varying between 0.108 and 0.083 inches and that the total weight of the wheelchair will be about 32 pounds. Thus, the novel wheelchair of the present invention is lighter than many conventional X frame wheelchairs known heretofore so as to further facilitate its ease of use. Also, although the preferred embodiment of the wheelchair has been described with both first and second hinges 30 and 40, respectively, applicant further contemplates that the wheelchair of the invention could be constructed with only second hinge 40 and function satisfactorily.

Thus, it will be understood that various details of the invention may be changed without departing from the scope of the invention. Furthermore, the foregoing description is for the purpose of illustration only, and not for the purpose of limitation—the invention being defined by the claims.

What is claimed is:

1. A wheelchair foldable from a open to a horizontally folded position and comprising:

first and second side frames;

drive wheels and traveling wheels rotatably carried by said side frames;

a foldable seat extending between said side frames, said seat being adapted to form a substantially flat, rigid surface when said wheelchair is open and to collapsably pivot upwardly when said wheelchair is folded; and hinge means extending between said side frames, said hinge means being adapted to pivot about an upwardly extending axis and to move rearwardly as said hinge moves from a substantially open position when said wheelchair is open to a substantially closed position when said wheelchair is folded, said hinge means comprising:

a first arm pivotably secured at one end to one of said side frames;

a second arm pivotably secured at one end to the other of said side frames and at the second end pivotably connected to the other end of said first arm so as to form a hinge therewith; and a rigid back support removably connected to said hinge means and pivoting about said upwardly extending axis from a first position wherein said back support extends transversely to the longitudinal axis of said open wheelchair to a second position wherein said back support has pivoted toward the longitudinal axis of said folded wheelchair.

2. A wheelchair according to claim 1 wherein said back support includes a resilient one piece cushion.

3. A wheelchair according to claim 1 including a resilient one piece cushion provided on said foldable seat.

4. A wheelchair according to claim 3 wherein said resilient cushion is adapted to remain secured to said seat when said seat is collapsed and said wheelchair is folded.

5. A wheelchair according to claim 1 including a second hinge means extending between said side frames, said second hinge means being adapted to pivot about an upwardly extending axis and to move rearwardly as said hinge means moves from a substantially open position when said wheelchair is open to a substantially closed position when said wheelchair is folded, said second hinge means comprising:

a first arm pivotably secured at one end to one of said side frames; and a second arm pivotably secured at one end to the other of said side frames and at the second end pivotably connected to the other end of said first arm so as to form a hinge therewith.

6. A wheelchair foldable from an open to a horizontally folded position and comprising:

first and second side frames;

drive wheels and traveling wheels rotatably carried by said side frames;

a foldable seat extending between said side frames, said seat comprising a pair of abutting seat elements pivotably connected adjacent their respective proximal sides for movement about a first pivot axis substantially parallel to the longitudinal axis of said wheelchair, and each seat element connected at its respective remote side to a respective one of said side frames for movement about second and third pivot axes, respectively, said seat elements being adapted to form a substantially flat, rigid surface when said wheelchair is open and to collapsably pivot about said axes when said wheelchair is folded, said first pivot axis being substantially parallel to and in substantially the same plane as said second and third pivot axes when said wheelchair is open and in a vertically elevated position relative to said first and second axis when said wheelchair is folded;

hinge means positioned adjacent the rear of said foldable seat and extending between said side frames, said hinge means being adapted to pivot about an upwardly extending axis and to move rearwardly as said hinge moves from a substantially open position when said wheelchair is open to a substantially closed position when said wheelchair is folded, said hinge means comprising:

a first arm pivotably secured at one end to one of said side frames and extending generally inwardly and rearwardly of said seat;

a second arm pivotably secured at one end to the other of said side frames and at the second end pivotably connected to the other end of said firm arm so as to form a hinge therewith; and a one piece rigid back support is removably connected to said hinge means and adapted to pivot about said upwardly extending axis from a first position wherein said back support extends transversely to the longitudinal axis of said open wheelchair to a second position wherein said back support has pivoted toward the longitudinal axis of said folded wheelchair, and wherein said back support is lockably engaged by said hinge means when said wheelchair is in an open position and is releasably engaged by said hinge means when said wheelchair is in a folded position.

7. A wheelchair according to claim 6 including a resilient one piece cushion provided on said foldable seat.

8. A wheelchair according to claim 7 wherein said resilient cushion is secured to only one of said pair of abutting seat elements and is adapted to move with and remain secured to said one seat element when said foldable seat is collapsed and said wheelchair is folded.

9. A wheelchair according to claim 6 wherein one of said second and third pivot axes of said foldable seat is spaced inwardly from its respective side frame to provide a space therebetween.

10. A wheelchair according to claim 6 wherein said back support includes a resilient one piece cushion.

11. A wheelchair according to claim 6 including a second hinge means positioned adjacent the front of said foldable seat and extending between said side frames, said second hinge means being adapted to pivot about an upwardly extending axis and to move rearwardly as said hinge means moves from a substantially open position when said wheelchair is open to a substantially closed position when said wheelchair is folded, said second hinge means comprising:

a first arm pivotably secured at one end to one of said side frames and extending generally inwardly and rearwardly; and a second arm pivotably secured at one end to the other of said side frames and at the second end pivotably connected to the other end of said first arm so as to form a hinge therewith.

12. A wheelchair foldable from an open to a horizontally folded position and comprising:

first and second side frames;

drive wheels and traveling wheels rotatably carried by said side frames;

a foldable seat extending between said side frames, said seat comprising a pair of abutting seat elements pivotably connected adjacent their respective proximal sides for movement about a first pivot axis substantially parallel to the longitudinal axis of said wheelchair, and each seat element connected at its respective remote side to a respective one of said side frames for movement about second and third pivot axes, respectively, wherein one of said second and third pivot axes is spaced inwardly from its respective side frame to provide a space therebetween, said seat elements being adapted to form a substantially flat, rigid surface when said wheelchair is open and to collapsably pivot about said axes when said wheelchair is folded, said first pivot axis being substantially parallel to and in substantially the same plane as said second and third pivot axes when said wheelchair is open and in a vertically elevated position relative to said first and second axis when said wheelchair is folded, said foldable seat further comprising a resilient cushion secured only to the one of said pair of abutting seat elements pivotable about said inwardly spaced pivot axis so that said cushion pivots upwardly with said one seat element and is nested in said space defined between the pivot axis of said seat element and its respective side frame when the wheelchair is folded;

hinge means positioned adjacent the rear of said foldable seat and extending between said side frames, said hinge means being adapted to pivot about an upwardly extending axis and to move rearwardly as said hinge moves from a substantially open position when said wheelchair is open to a substantially closed position when said wheelchair is folded, said hinge means comprising:

a first arm pivotably secured at one end to one of said side frames and extending generally inwardly and rearwardly of said seat;

a second arm pivotably secured at one end to the other of said side frames and at the second end pivotably connected to the other end of said first arm so as to form a hinge therewith; and a rigid back support removably connected to said hinge means and adapted to pivot about said upwardly extending axis from a first position wherein said back supports extends transversely to the longitudinal axis of said open wheelchair to a second position wherein said back support has pivoted toward the longitudinal axis of said folded wheelchair, and wherein said back support is lockably engaged by said hinge means when said wheelchair is in an open position and is releasably engaged by said hinge means when said wheelchair is in a folded position.

* * * * *